(12) United States Patent
Tachiiwa (10) Patent No.: US 10,099,601 B2
(45) Date of Patent: Oct. 16, 2018

(54) VEHICLE LAMP

(71) Applicant: Koito Manufacturing Co., Ltd., Tokyo (JP)

(72) Inventor: Takeyuki Tachiiwa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/415,976

(22) Filed: Jan. 26, 2017

(65) Prior Publication Data

US 2017/0225607 A1 Aug. 10, 2017

(30) Foreign Application Priority Data

Feb. 4, 2016 (JP) .................................. 2016-019423

(51) Int. Cl.
*B60Q 1/00* (2006.01)
*B60Q 1/068* (2006.01)
*F21S 41/27* (2018.01)
*F21S 41/30* (2018.01)

(52) U.S. Cl.
CPC ...... *B60Q 1/0683* (2013.01); *B60Y 2410/121* (2013.01); *F21S 41/27* (2018.01); *F21S 41/30* (2018.01)

(58) Field of Classification Search
CPC ........ B60Q 1/0683; F21S 41/30; F21S 41/27; B60Y 2410/121
See application file for complete search history.

(56) References Cited

U.S. PATENT DOCUMENTS

| 5,034,870 A * | 7/1991 | Weber ................. | B60Q 1/0683 362/428 |
| 6,641,292 B2 * | 11/2003 | Miki ..................... | B60Q 1/076 362/284 |
| 2004/0240222 A1 * | 12/2004 | Brazas ................. | B60Q 1/0683 362/514 |

FOREIGN PATENT DOCUMENTS

JP 2008-243604 A 10/2008

* cited by examiner

*Primary Examiner* — Evan Dzierzynski
*Assistant Examiner* — Naomi M Wolford
(74) *Attorney, Agent, or Firm* — Abelman, Frayne & Schwab (57) ABSTRACT

Provided is a vehicle lamp including an operation unit configured to operate an optical axis adjustment bevel gear provided in a lamp to be axially rotated. An axial rotation force transfer body of the operation unit includes an operation rod operated to be axially rotated, a driving rod engaged with the gear, and a wire interconnecting the operation rod and the driving rod in an axial rotation direction, and the driving rod is formed of a metal which is hard to rust. The driving rod is formed by a metal/injection/molding (MIM) technique. A support member extends between the driving rod and the lamp.

10 Claims, 7 Drawing Sheets

VEHICLE LAMP

CROSS-REFERENCE TO RELATED APPLICATIONS

This application is based on and claims priority from Japanese Patent Application No. 2016-019423, filed on Feb. 4, 2016, with the Japan Patent Office, the disclosure of which is incorporated herein in its entirety by reference.

TECHNICAL FIELD

The disclosure relates to a vehicle lamp. In particular, the present disclosure relates to a vehicle lamp provided with an operation unit configured to perform an adjusting operation of an aiming adjustment (optical axis adjustment) mechanism at a separate position.

BACKGROUND

A head lamp (front lamp) of a vehicle such as, for example, an automobile, is provided with an aiming adjustment mechanism to adjust a lamp optical axis in a predetermined angle direction in front of the automobile. As the aiming adjustment mechanism, a configuration of operating an aiming screw disposed in a lamp housing is generally adopted. For example, the aiming screw is screw-connected to at least a portion of a lamp unit equipped within the lamp housing. By operating the aiming screw to be axially rotated from the outside of the lamp unit, the screw-connected portion of the lamp unit is screwed along the axial direction of the aiming screw, and the vertical and horizontal tilting angles of the lamp unit are adjusted.

In order to operate the aiming screw to be axially rotated, a bevel gear (umbrella gear) or a crown gear is generally provided at the end of the aiming screw exposed to the outside of the lamp housing. When the tip end of a tool such as, for example, a plus driver (Phillips driver) is inserted between the bevel gear or the crown gear and the external surface of the lamp housing, and the plus driver is operated to be axially rotated so as to rotate the bevel gear or the crown gear, the aiming screw is axially rotated.

Japanese Laid-Open Patent Publication No. 2008-243604 suggests an operation unit connected to the crown gear, in order to improve the workability of the aiming screw in the aiming adjustment. The operation unit includes an operation rod which is axially rotated directly by a plus driver, a wire of which one end is integrally connected to the operation rod in the axial rotation direction, and a driving rod which is integrally connected to the other end of the wire in the axial rotation direction to be engaged with the crown gear. By using the operation unit, when the operation rod is operated to be axially rotated, the axial rotation is transferred to the driving rod as well through the wire, which enables the rotation of the crown gear engaged with the driving rod, and the aiming adjustment at a position spaced apart from the crown gear. Therefore, the workability is improved.

SUMMARY

Japanese Laid-Open Patent Publication No. 2008-243604 does not disclose a material of the driving rod engaged directly with the crown gear, among the components of the operation unit. However, when the driving rod is made of a resin, the driving rod is easily worn out during the axial rotation operation due to the engagement with the crown gear made of a metal so that the reliability is deteriorated. As for the problem of wear, the driving rod may be formed of a metal. However, in an iron-based metal that is easily processed (e.g., forged), a problem of a corrosion occurs due to an occurrence of rust.

Further, as described in detail later, when the driving rod is formed of a metal, the external surface of the resin-made lamp housing which is in contact with the driving rod during the axial rotation operation of the driving rod is worn out by the driving rod. When a gap is secured so that the driving rod is not in contact with the external surface of the lamp housing, the driving rod rattles during the axial rotation of the driving rod due to the gap. As a result, the smooth torque transfer from the driving rod to the crown gear is damaged, and the operability of the aiming adjustment is deteriorated.

An object of the present disclosure is to resolve the problems and provide a vehicle lamp provided with an operation unit in which the reliability of the operation unit that performs an aiming adjustment is improved, and the operability in the aiming adjustment is improved.

The present disclosure includes an operation unit configured to operate an optical axis adjustment gear provided in a vehicle lamp to be axially rotated. The operation unit includes an operation rod operated to be axially rotated, a driving rod engaged with the gear, and a wire interconnecting the operation rod and the driving rod in the axial rotation direction. The driving rod is formed of a metal which is hard to rust.

In the present disclosure, the driving rod is configured as a molded product that is formed by a metal/injection/molding (MIM) technique. Further, the present disclosure includes a wear-resistant support member interposed between the driving rod and the lamp. The wire may also be formed of a metal which is hard to rust.

In the present disclosure, the operation unit includes a case that covers the operation rod, the driving rod, and the wire. The case is fixedly supported to the lamp at least at each portion covering the operation rod and the driving rod, and the fixedly supporting at the operation rod may be implemented by a configuration where the case is attachable/detachable with respect to a holder provided in the lamp. For example, the case and the holder are configured such that a hook provided in one of the case and the holder and an engagement hole formed in the other are engaged with or disengaged from each other.

By the present disclosure, since the driving rod of the operation unit is made of metal which is hard to rust, the problem in the aiming adjustment caused from rust is suppressed in advance so that the reliability of the aiming adjustment may be improved. Further, since the driving rod includes the support member, the wear of the lamp may be suppressed, and the smooth torque (axial rotation force) transfer during the aiming adjustment may be ensured so that the operability of the aiming adjustment may be improved.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
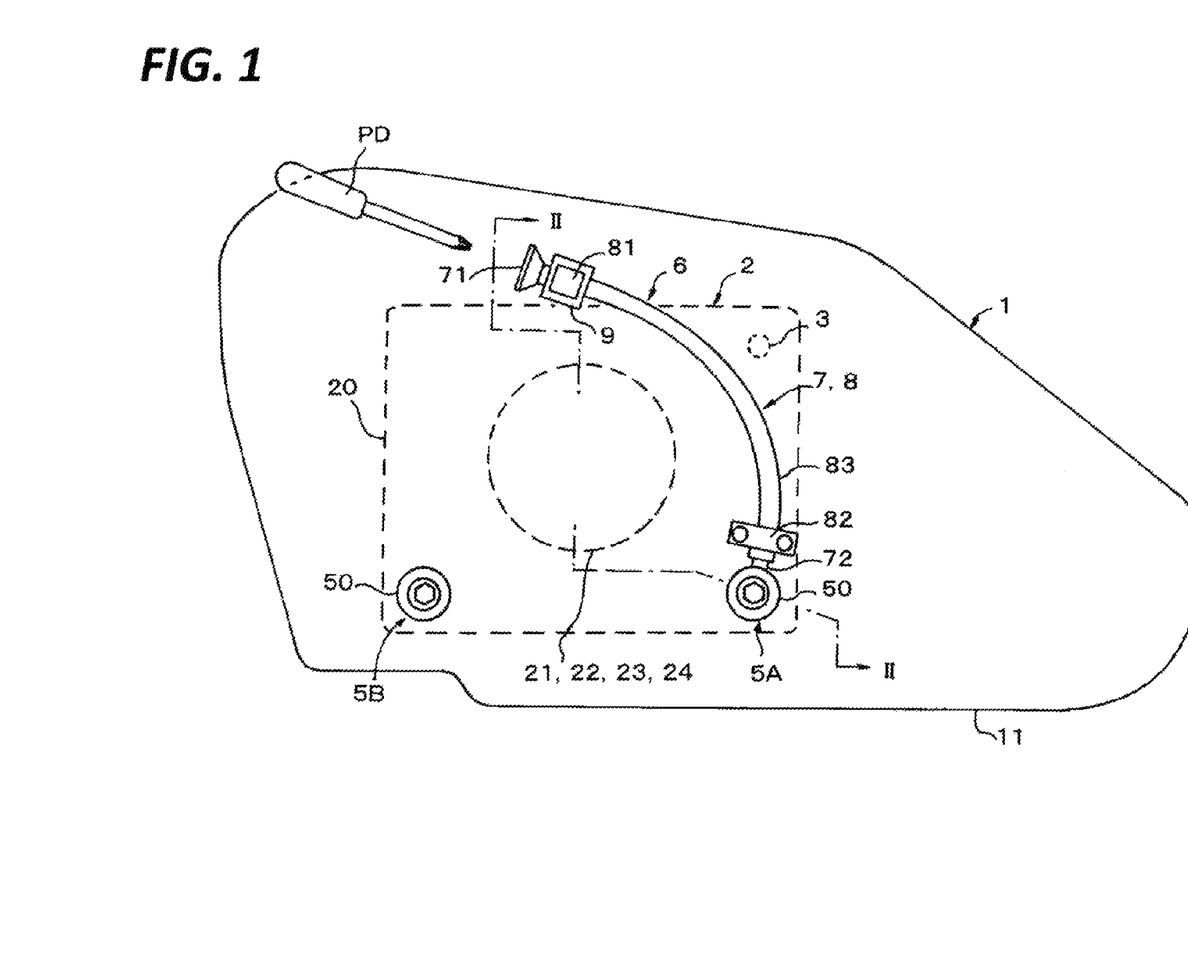
FIG. 1 is a rear view of a head lamp to which the present disclosure is applied.
Figure 2:
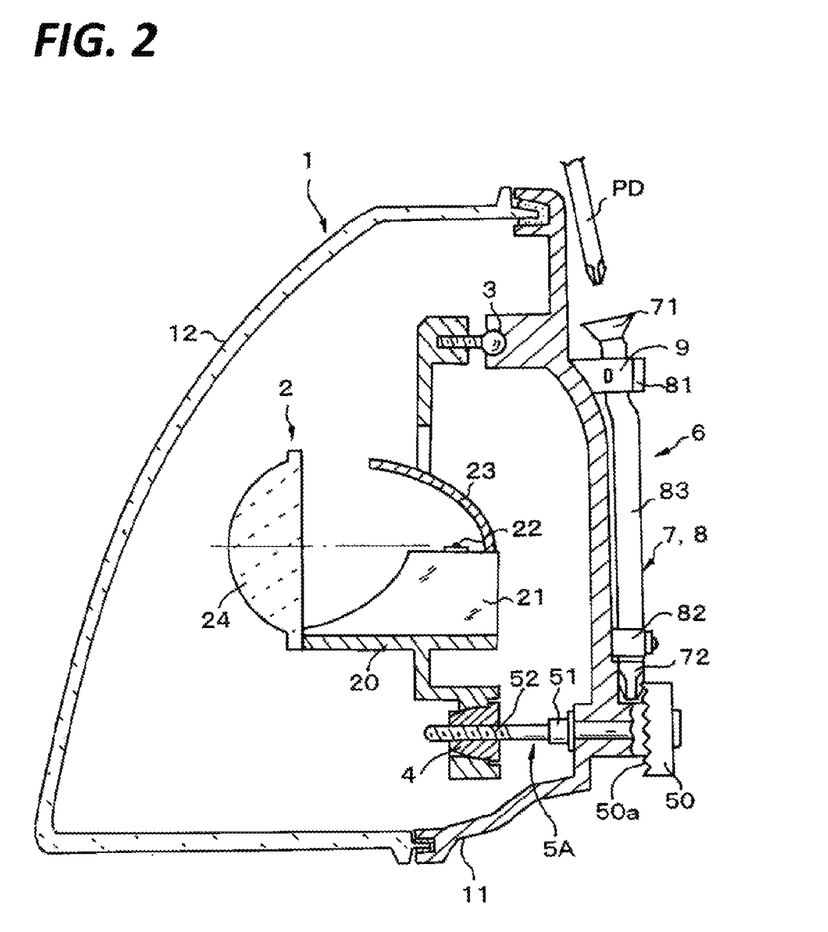
FIG. 2 is a sectional view taken along the line II-II of FIG. 1.

Next, exemplary embodiments of the present disclosure will be described with reference to the drawings. FIG. 1 is a rear view of the left head lamp of an automobile to which the present disclosure is applied, and FIG. 2 is an enlarged sectional view taken along the line II-II of FIG. 1. As illustrated in FIG. 2, a lamp housing 1 is formed with a resin-made lamp body 11 and a front cover 12 made of a light transmitting resin and attached to cover the front surface of the lamp body 11. A lamp unit 2 is equipped inside the lamp housing 1.

The lamp unit 2 is formed as a projector-type lamp unit including a base body 21, a light source 22 (e.g., a light emission diode (LED)) mounted on the base body 21, a reflector 23 fixed to the base body 21 to cover the upper side region of the light source 22, and a projection lens 24 fixed to the base body 21 at the front side position of the light source 2. Light emitted from the light source 22 is reflected by the reflector 23, and projected by the projection lens 24 to the forward region with a required light distribution so that the lamp unit 2 functions as the head lamp of the automobile.

A substantially rectangular plate shaped frame 20 is integrally formed with the base body 21 of the lamp unit 2 to be disposed over a required surface region when viewed in the front and rear direction of the lamp. The frame 20 is supported to the lamp body 11 by a ball shaft 3 at one position of the surface region of the frame 20. Driven nuts 4 are supported at other two positions of the surface region of the frame 20, and screw portions 52 of first and second aiming screws 5A and 5B are screw-connected to the driven nuts 54, respectively. FIG. 2 illustrates only the first aiming screw 5A. The first and second aiming screws 5A and 5B are axially rotatably supported to the lamp body 11 through shafts 51 in a state of being directed in the front and rear direction of the lamp.

Due to the support by the ball shaft 3 and the two aiming screws 5A and 5B, the frame 20, i.e. the lamp unit 2 may be vertically and laterally tilted using the ball shaft 3 as a fulcrum. When the first aiming screw 5A disposed vertically opposite to the ball shaft 3 is axially rotated, the driven nut 4 screw-connected to the first aiming screw 5A is screwed in the front-and-rear direction of the lamp, and the vertical tilting position of the lamp unit 2 is adjusted. The second aiming screw 5B (not illustrated in FIG. 2) is disposed laterally opposite to the ball shaft 3, and when the second aiming screw 5B is axially rotated, the lateral tilting position of the lamp unit 2 is adjusted. Accordingly, by operating the first and second aiming screws 5A and 5B to be axially rotated, the angle of the optical axis of the lamp unit 2 may be adjusted so that the aiming adjustment is implemented.

As can be seen from the first aiming screw 5A illustrated in FIG. 2, each of the first and second aiming screws 5A and 5B is axially supported to the lamp body 11 to be axially rotatable in a state where the shaft 51 penetrates through the lamp body 33 in the front-and-rear direction. In addition, the screw portion 52 formed at the tip end region of the shaft 51 is screw-connected to the driven nut 4. In addition, a bevel gear (umbrella gear) 50 having a concave conical inner surface on which a plurality of gear teeth is radially arranged is integrally provided at the external ends of the shaft 51 exposed to the outside of the lamp housing 1 from the rear surface of the lamp body 11. Here, the shaft 51 and the bevel gear 50 of the aiming screw 5A are formed of a metal material, but may be formed by integrally molding a resin.

The plurality of gear teeth 50a formed at the bevel gear 50 are arranged with a required gap from the rear surface of the lamp body 11. Accordingly, although not illustrated, the tip end of a plus driver is inserted into the gap from the lateral side of the bevel gear 50, and engaged with the gear teeth 50a. Then, when the plus driver is axially rotated, the bevel gear 50 is rotated around the shaft 51 so that the aiming screw 5A may be axially rotated.

Meanwhile, as illustrated in FIG. 1, an operation unit 6 is provided on the rear surface of the lamp body 11 to extend from the position of the aiming screw 5A to another position spaced apart from the position of the aiming screw 5A (here, a position close to the upper side of the lamp body 11), and supported to the lamp body 11. In the present exemplary embodiment, no operation unit 6 is provided for the second aiming screw 5B, but the operation unit 6 may be provided for the second aiming screw 5B.

Figure 3:
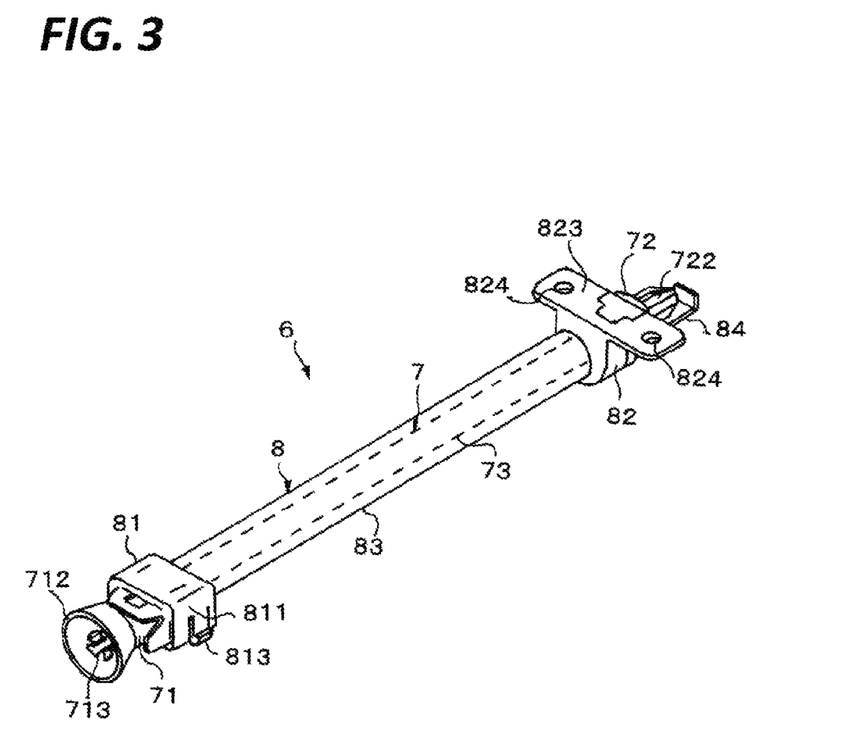
FIG. 3 is a view schematically illustrating an external appearance of an operation unit.
Figure 4:
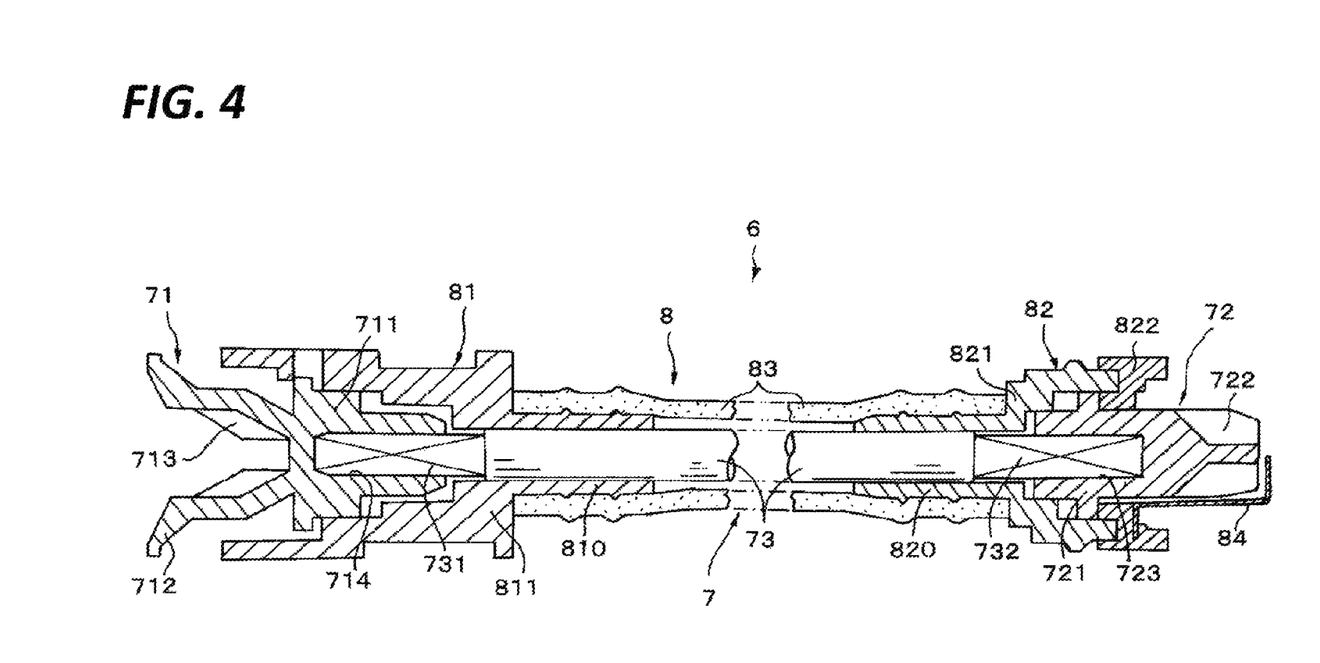
FIG. 4 is a longitudinal sectional view of the operation unit illustrating a main portion in an enlarged scale.

FIG. 3 is a view schematically illustrating an external appearance of the operation unit 6 before being assembled to the lamp body 11, and FIG. 4 is a longitudinal sectional view of the operation unit 6 illustrating a main portion in an enlarged scale. The operation unit 6 is formed with an axial rotation force transfer body 7 that transfers a torque, i.e., an axial rotation force, and a case 8 that coats the axial rotation force transfer body 7.

The technical idea of the axial rotation force transfer body 7 is basically identical to that of Japanese Laid-Open Patent Publication No. 2008-243604. The axial rotation transfer body 7 has a configuration in which an operation rod 71 and a driving rod 72 are longitudinally connected by a wire 73. The operation rod 71 is formed of a rigid resin and includes a cylindrical shaft 711, a guide 712 integrally formed at one end of the shaft 711 and having an inverse conical funnel shape of which an opening diameter is larger than the tip end of the plus driver PD to be used as a tool which will be described later, and an engagement unit 713 provided on the inner bottom surface of the guide 712 and having a cross groove to be engaged with the tip end of the plus driver PD. The cross groove of the engagement unit 713 is identical to a cross groove formed on the head of a general plus screw.

One end of the wire 73 is connected to the other end of the shaft 711. The wire 73 has a circular sectional surface which is perpendicular to the longitudinal direction of the wire 73, and is formed with a predetermined length. The wire 73 is made of a material having moderate flexibility in the longitudinal direction thereof and high rigidity in the shaft circumference direction thereof (here, stainless steel). The opposite ends of the wire 73 are formed as connectors 731 and 732 each having a rectangular sectional surface, and the connector 731 at one end of the wire 73 is in a state of being inserted into a rectangular concave portion 714 formed at the other end of the shaft 711. Accordingly, the operation rod 71 and the wire 73 are integrated with each other at least in the shaft circumference direction.

The driving rod 72 is formed of stainless steel which is hard to rust, and includes a cylindrical shaft 721 and an engagement unit 722 integrally formed at one end of the shaft 721. The engagement unit 722 is formed in a cross shape almost identical to the tip end of the plus driver. In addition, a rectangular concave portion 723 is formed in the other end of the shaft 721, and the connector 732 at the other end of the wire 73 is in a state of being inserted into the concave portion 723. Accordingly, the driving rod 72 and the wire 73 are also integrated with each other at least in the shaft circumference direction.

Conventionally, the driving rod 72 has been formed of an iron-based material. This is intended to enable the manufacture by forging in order to easily form the engagement unit 722 and the rectangular concave portion 723 in the driving rod 72. Hence, a problem of rust has occurred in using the driving rod 72 over years. When rust occurs, the state of the engagement with the bevel gear 50 of the aiming screw 5A is deteriorated, thereby making the optical axis adjustment difficult. In the present exemplary embodiment, the problem of rust is resolved by manufacturing the driving rod 72 using the metal-injection-mold (MIM) technique so that the engagement unit 722 and others may be manufactured in a desired shape even with a stainless steel material which is hard to rust.

As illustrated in FIG. 3, the case 8 of the operation unit 6 includes an operation case 81 that covers the operation rod 71, a driving case 82 that covers the driving rod 72, and a wire case 83 that covers the wire 73.

Figure 5:
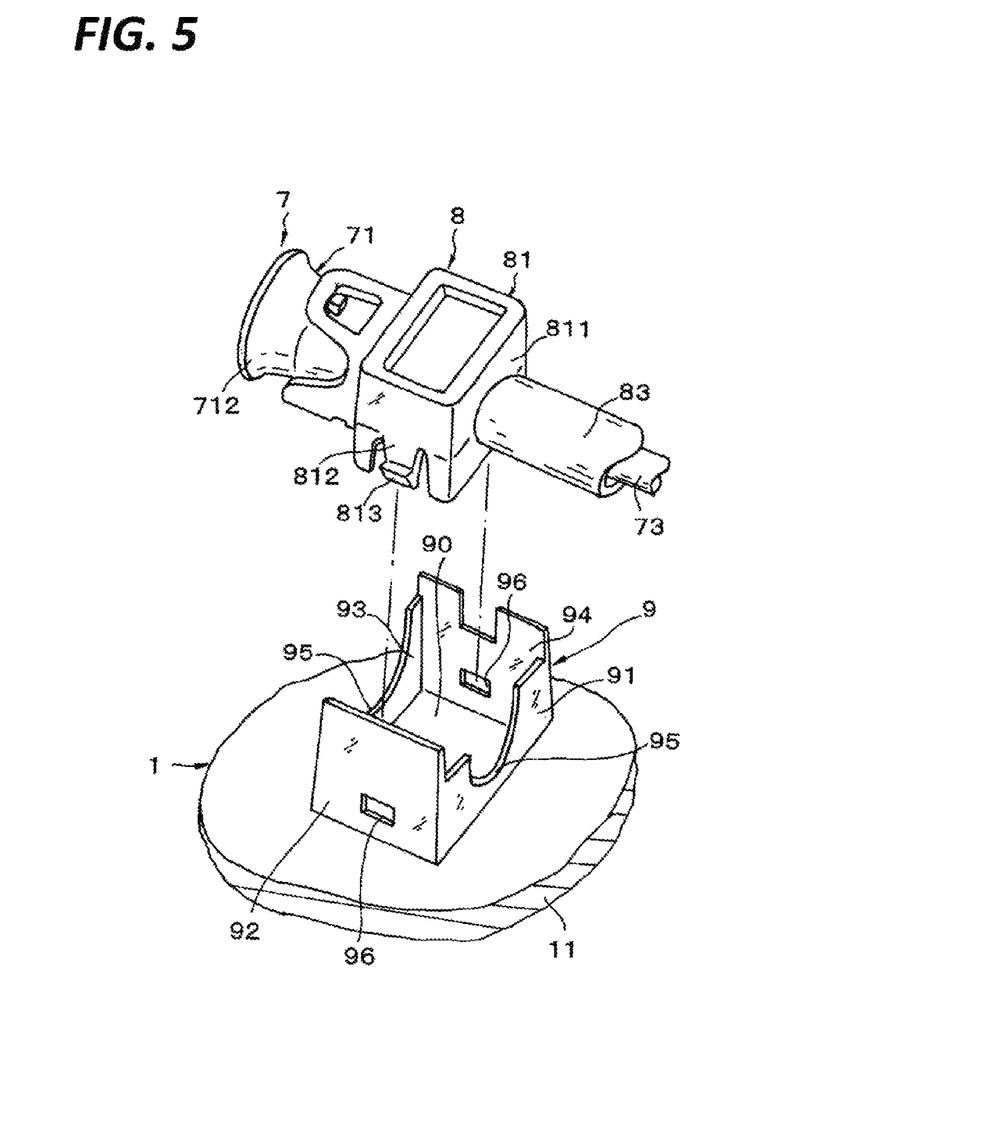
FIG. 5 is a perspective view illustrating an external appearance including an operation case.

FIG. 5 is a perspective view illustrating an external appearance including the operation case 81. Referring to FIG. 4 together, the operation case 81 is formed of a resin material, and includes a substantially cylindrical bearing 811 that axially rotatably supports the shaft 711 of the operation rod 71. The bearing 811 is configured to suppress the operation rod 71 from dropping out in the axial direction, but descriptions of the configuration are omitted herein. In addition, the guide 712 of the operation rod 71 protrudes axially from the bearing 811 and is configured to enable the axial rotation operation to the operation rod 71 as described later.

A pair of support pieces 812 (FIG. 5 illustrates only the front support piece) is integrally provided on the opposite external side surfaces of the bearing 811, i.e., the opposite side surfaces of the bearing 811 in the direction perpendicular to the axial direction, to extend in parallel with each other in the same direction. The pair of support pieces 812 have slight elasticity in the plate thickness direction, and a hook 813 is integrally formed on the external surface of the tip end of each support piece 812 in the downward extension direction thereof to protrude in a wedge shape in the plate thickness direction.

Figure 6:
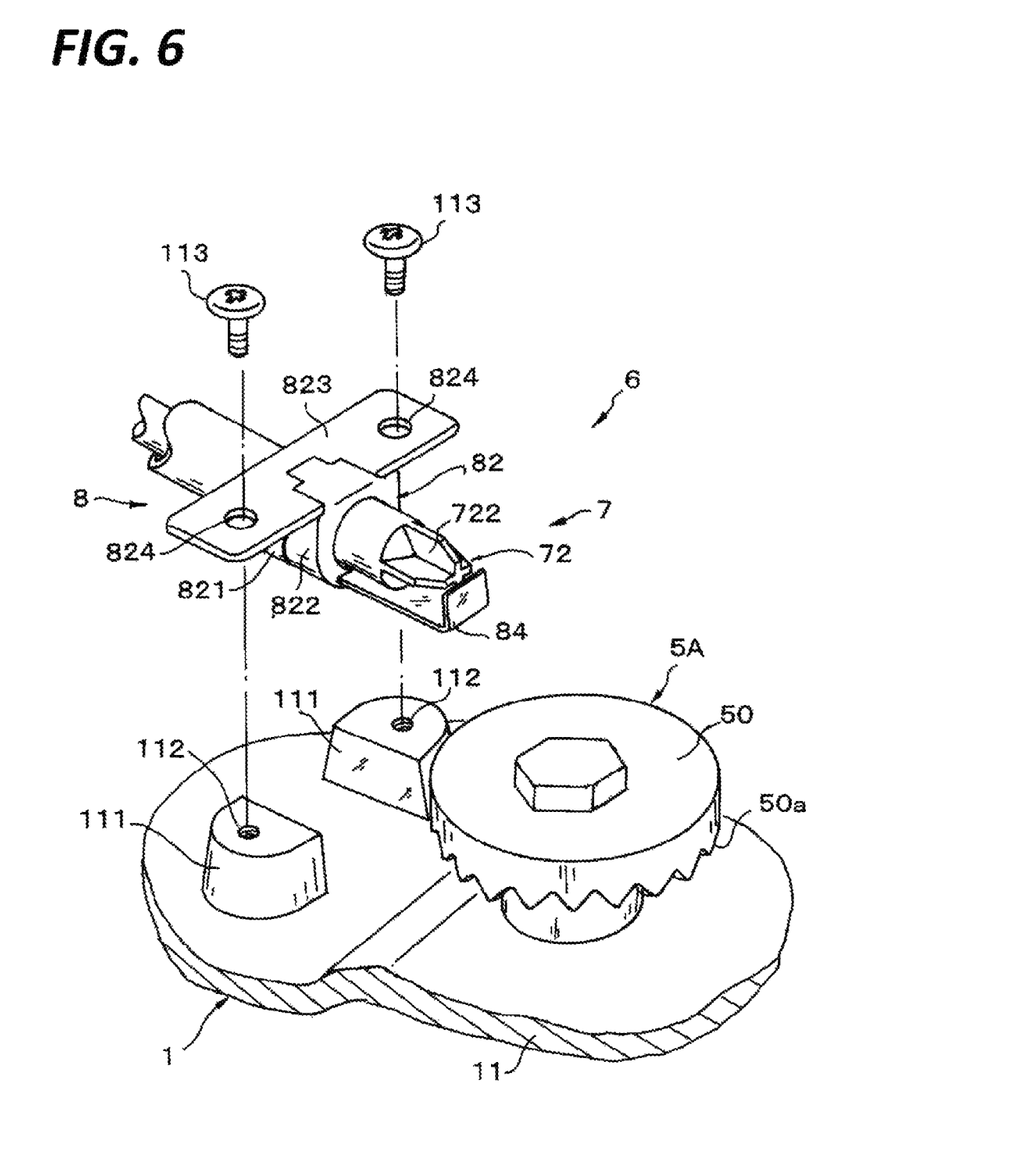
FIG. 6 is a perspective view illustrating an external appearance including a driving case.

FIG. 6 is a perspective view illustrating an external appearance including the driving case 82. Referring to FIG. 4 together, the driving case 82 is formed of a resin material and includes a substantially cylindrical bearing 821 that internally supports the shaft 721 of the driving rod 72 to be axially rotatable, and a cover 822 that is integrally attached to the bearing 821 in the axial direction. The shaft 721 is supported by the bearing 821 and the cover 822, and the dropout of the shaft 721 is suppressed. The engagement unit 722 of the driving rod 72 penetrates through the cover 822 to be exposed to the outside.

A pair of wing-shaped support pieces 823 is integrally provided in a partial circumference region of the outer circumferential surface of the bearing 821 (here, the upper side circumference region in FIG. 6) to extend bilaterally toward the tangential direction of the external circumferential surface (in the horizontal direction in FIG. 6). Screw insertion through holes 824 are formed on the longitudinally opposite end portions of the support pieces 823, respectively, to penetrate therethrough in the plate thickness direction.

In addition, a support member 84 extends along the engagement unit 722 of the driving rod 72 to be integrally supported to the cover 822. The support member 84 extends along the circumference region of the bearing 821 which is diametrically opposite to the circumference region of the bearing unit 821 provided with the support pieces 823. The support member 84 is formed of a material that has a wear resistance and preferably, a certain spring property, and furthermore, is hard to rust. Here, a plate shaped small stainless steel piece is used. The base end of the support member 84 is integrated with the cover 822 in a state of being embedded in the cover 822, and the tip end thereof is bent in an L shape in the plate thickness direction so as to cover the region of the driving rod 72 which spreads from one side region of the driving rod 72 to the shaft end region thereof. The support member 84 is disposed in a state of being close to or almost in contact with the engagement unit 772.

The wire case 83 is formed by a resin-made flexible tube which covers the entire circumference of the wire 73. The wire case 83 extends over the substantially entire length of the wire 73, and the opposite ends thereof are connected to tubes 810 and 820 provided in the operation case 81 and the driving case 82, respectively, in a state where the tubes 810 and 820 are fitted into the opposite ends of the wire case 83. The inner diameter dimension of the wire case 83 is larger than the outer diameter dimension of the wire 73, and the wire 73 is axially rotatable inside the wire case 83.

The operation unit 6 configured as described above is supported to the rear surface of the lamp body 11 as illustrated in FIGS. 1 and 2. That is, the case 8 of the operation unit 6 is fixedly supported to the rear surface of the lamp body 11, and accordingly, the axial rotation force transfer body 7 supported in the case 8 in the state of being equipped therein, i.e., the operation rod 71, the driving rod 72, and the wire 73 are supported to be axially rotatable around their axes, respectively.

As illustrated in FIG. 6, on the rear surface of the lamp body 11, a pair of bosses 111 is formed in positions adjacent to the bevel gear 50 provided in the aiming screw 5A with a required interval to integrally protrude therefrom with a required height, and screw holes 112 are formed in the bosses 111, respectively. The driving case 82 of the operation unit 6 are disposed between the opposite bosses 111 to be sandwiched therebetween, and screws 113 are inserted through the screw insertion through holes 824 formed on the pair of support pieces 823 of the driving case 82. Then, these screws 113 are screw-connected to the screw holes 112 so that the driving case 82 is fixedly supported to the lamp body 11.

Figure 7:
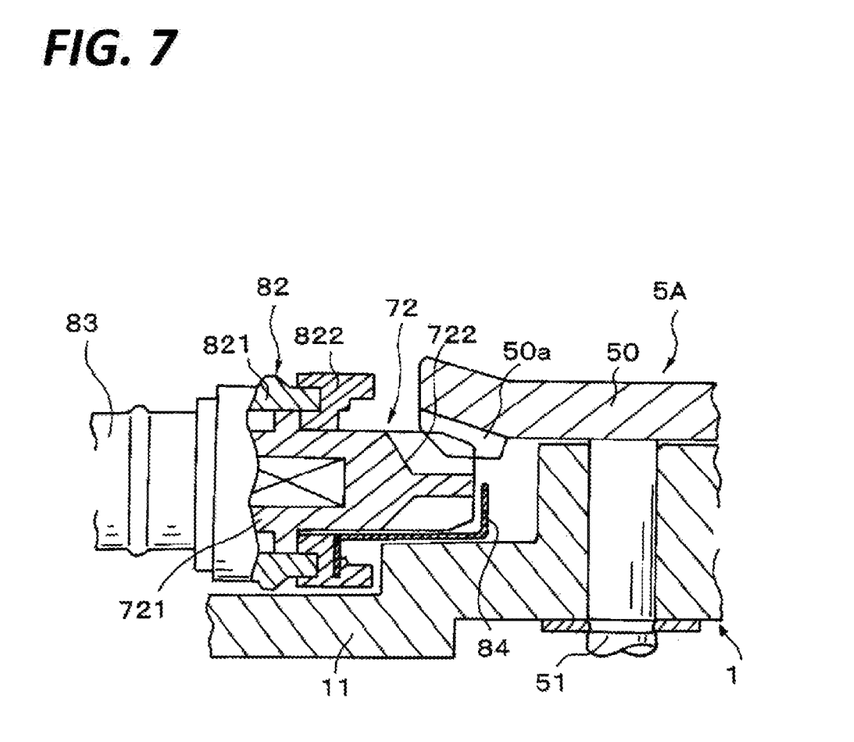
FIG. 7 is a sectional view illustrating an engaged state of a driving rod and a bevel gear.

When the driving case 82 is fixed as described above, as can be seen from the sectional view illustrated in FIG. 7, the engagement unit 722 of the driving rod 72 is brought into a state of being inserted into the gap between the gear teeth 50a and the rear surface of the lamp body 11 from the lateral side of the bevel gear 50, and the connector 72 is engaged with the gear teeth 50a. Accordingly, when the driving rod 72 is axially rotated, the bevel gear 50 is rotated, and the aiming screw 5A is axially rotated.

In the state where the driving rod 72 is inserted into the gap between the gear teeth 50a of the bevel gear 50 and the rear surface of the lamp body 11, the support member 84 provided in the cover 822 is interposed between the rear surface of the lamp body 11 and the engagement unit 722 of the driving rod 72 in a state of being close to or almost in contact with the rear surface of the lamp body 11. Accordingly, while the engagement unit 722 is supported in a state of being sandwiched between the support member 84 and the gear teeth 50a of the bevel gear 50, the engagement unit 722 is suppressed from directly contacting with the rear surface of the lamp body 11.

Meanwhile, as illustrated in FIG. 1, the operation case 81 of the operation unit 6 is supported in the upper side region of the rear surface of the lamp body 11 which is easily reached by the hand of an operator. Since the wire 73 and the wire case 83 of the operation unit 6 are flexible, the operation unit 6 may be disposed and supported in a state of being bent in a curve shape in the region reaching from the driving case 82 to the operation case 71.

As illustrated in FIG. 5, the operation case 81 is supported in a state of being inserted into in a holder 9 provided to be erected on the rear surface of the lamp body 11. The holder 9 includes four side walls 91 to 94 that form a nearly rectangular opening 90. Among the four side walls 91 to 94, the pair of side walls 91 and 93 that are opposite to each other along the extending direction of the operation unit 6 are provided with notches 95 each formed in an arc shape from the tip end edge of each wall. The notches 95 are configured to support the bearing 811 of the operation case 81 thereon. In addition, rectangular engagement holes 96 are formed on the other pair of side walls 92 and 94 that are orthogonal to the side walls 91 and 93 in the plate thickness direction. The pair of hooks 813 provided on the support pieces 812 of the operation case 81 may be engaged with the engagement holes 96.

Accordingly, when the operation case 81 of the operation unit 6 is supported to the lamp body 11, the operation case 81 may be inserted into the opening 90 of the holder 9. The bearing 811 of the operation case 81 is supported on the notches 95 of the pair of side walls 91 and 93. According to the insertion, the pair of support pieces 812 of the operation case 81 are inserted along the inner surfaces of the other pair of walls 92 and 94. Then, when the pair of support pieces 812 are inserted to a predetermined position, the hooks 813 of the support pieces 812 are engaged with the engagement holes 96, respectively, so that the hooks 813 of the support pieces 812 and the engagement holes 96 are brought into the engaged state.

Accordingly, since the operation case 81 may be fixedly supported to the holder 9 and supported to the lamp body 11 without using screws, the number of components for the fixed supporting may be reduced. Further, it is natural that, by pushing the hooks 813 inwardly from the opposite sides, the engagement with the engagement holes 96 is released so that the operation case 81 may be removed from the holder 9.

In order to perform the aiming adjustment of the head lamp using the operation unit 6 fixedly supported to the lamp body 11 as described above, the operation rod 71 of the operation unit 6 is axially driven by the plus driver PD as illustrated in FIGS. 1 and 2. That is, the tip end of the plus driver PD is inserted into the guide 712 of the operation rod 71 and engaged with the engagement unit 713 of the operation rod 71. Since the guide 712 is of a funnel shape, the guide 712 may guide the insertion of the tip end of the plus driver PD to cause the tip end to be reliably engaged with the engagement unit 713.

When the operation rod 71 is operated to be axially rotated using the plus driver PD, the axial rotation of the operation rod 71 is transferred to the wire 73, and the axial rotation of the wire 73 is transferred up to the driving rod 72. Even when the wire 73 is disposed to be bent, the wire 73 is axially rotatable, and the axial rotation force may be transferred from the operation rod 71 to the driving rod 72. When the driving rod 72 is axially rotated, the bevel gear 50 is axially rotated by the engagement between the engagement unit 722 and the gear teeth 50a of the bevel gear 50, and the first aiming screw 5A is axially rotated. The vertical aiming adjustment of the lamp unit 2 is performed by the axial rotation of the first aiming screw 5A.

At this time, when the support member 84 is set to be in a state of elastically contacting with the rear surface of the lamp body 11, the engagement unit 722 of the driving rod 72 is urged to the bevel gear 50 by an elastic reaction force so that the state of the engagement with the gear teeth 50a may be stably held. Accordingly, the driving rod 72 is suppressed from rattling during the axial rotation thereof, and the smooth torque transfer from the driving rod 72 to the bevel gear 50 is ensured so that the operability in the aiming adjustment is improved.

In addition, since the support member 84 is interposed between the driving rod 72 and the rear surface of the lamp body 11, the engagement unit 722 of the driving rod 72 is suppressed from directly contacting with the rear surface of the lamp body 11. Accordingly, when the metal-made driving rod 72 is axially rotated, the wear of the rear surface of the lamp body 11 is suppressed which occurs because the axial rotation is performed in the state where the engagement unit 722 contacts with the rear surface of the lamp body 11.

Since the driving rod 72 is formed of the stainless steel that is hard to rust, the occurrence of rust caused from the use over years may be suppressed so that the state of the engagement with the bevel gear 50 may be suppressed from being damaged by the rust, and the reliability of the aiming adjustment may be suppressed from being deteriorated. Further, since the driving case 82 holding the driving rod 72 is fixed to the lamp body 11 by the screws 113, the driving rod 72 may be firmly supported, and the state of the engagement with the bevel gear 50 may be stably held. Since the driving case 82 is fixed by the screws 113, it may not be easy to replace only the driving rod 72 by releasing the fixture. However, since the replacement required when rust occurs in the driving rod 72 is hardly performed, the replacement frequency may be reduced.

Since the wire 73 also is formed of the stainless steel that is hard to rust, the defective axial rotation within the wire case 83 caused by the occurrence of rust or the defective aiming adjustment caused thereby may be suppressed in advance. Since the wire 73 also is equipped in the wire case 83, it may not be easy to replace the wire 73, but the replacement for the occurrence of rust is almost unnecessary.

Meanwhile, since the operation rod 71 is made of a resin, there is a case where the replacement of the operation rod 71 is necessary in view of durability. In that case, when the engagement with the engagement holes 96 is released by pushing the hooks 813 of the operation case 81 from the opposite sides, the operation case 81 may be simply removed from the holder 9. Then, when the operation rod 71 is pulled in the direction of the tip end thereof, the fitting of the operation rod 71 with the wire 73 in the rectangular concave portion 714 may be released, and the operation rod 71 may be removed from the operation case 81 so that the operation rod 71 may be easily replaced. Accordingly, the operation rod 71 may not be necessarily made of a metal material which is hard to rust, and may be formed at a low cost. This supporting form is sufficient since a certain strong force is not applied during the operation of the operation rod 71.

When the holder 9 is provided at each of a plurality of positions on the rear surface of the lamp body 11, the support position of the operation rod 71 may be changed by removing the operation case 81 from one holder and fixing the operation case 81 to another holder. Accordingly, a work position when the aiming adjustment is performed may be arbitrarily changed depending on a preference of an operator. In this case, it is natural that the operation case 81 may be changed to an arbitrary position by the flexibility of the wire 73 and the wire case 83.

While descriptions have made on the operation unit configured to adjust the first aiming screw 5A, the descriptions may be identically applied to the second aiming screw 5B as well.

In the exemplary embodiment, the driving rod and the wire are made of stainless steel as an example of a material which is hard to rust, but made of another material which is hard to rust. In addition, the driving rod may be made of metal which may be manufactured by the MIM technique.

In the present disclosure, the engagement unit of each of the operation rod and the driving rod is not limited to the cross structure of the plus driver described in the exemplary embodiment, and may adopt any arbitrary structure as long as the structure may be engaged with the operation tool to produce the axial rotation force (torque) and engaged with an aiming gear to transfer the axial rotation force.

The vehicle lamp of the present disclosure is not limited to the head lamp of the exemplary embodiment, and any lamp may be applied as long as the lamp includes an aiming gear for the axial function adjustment.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle lamp comprising:
   an operation unit configured to operate an optical axis adjustment gear provided in the vehicle lamp to be axially rotated,
   wherein the operation unit includes an operation rod operated to be axially rotated, a driving rod engaged with the gear, and a wire interconnecting the operation rod and the driving rod in an axial rotation direction, and the driving rod is formed of a metal which is hard to rust, and
   the operation unit includes a wear-resistant support member interposed between the driving rod and the vehicle lamp.

2. The vehicle lamp of claim 1, wherein the driving rod is a molded product formed by a metal/injection/molding (MIM) technique.

3. The vehicle lamp of claim 2, wherein the wire is formed of a metal which is hard to rust.

4. The vehicle lamp of claim 2, wherein the operation unit includes a case covering the operation rod, the driving rod, and the wire, the case is fixedly supported to the vehicle lamp at least in each position covering the operation rod and the driving rod, and the operation rod is fixedly supported by a configuration where the case is attachable/detachable with respect to a holder provided in the vehicle lamp.

5. The vehicle lamp of claim 4, wherein the case and the holder are configured such that a hook provided in one of the case and the holder and an engagement hole formed in the other are engaged with or disengaged from each other.

6. The vehicle lamp of claim 4, wherein the holder is plural.

7. The vehicle lamp of claim 1, wherein the wire is formed of a metal which is hard to rust.

8. The vehicle lamp of claim 1, wherein the metal includes a stainless steel.

9. The vehicle lamp of claim 1, wherein the wear-resistant support member is in elastic contact with the vehicle lamp.

10. The vehicle lamp of claim 1, wherein the operation rod is made of a resin.

* * * * *